(12) United States Patent
Hinton

(10) Patent No.: US 6,818,069 B1
(45) Date of Patent: Nov. 16, 2004

(54) DECAL REMOVAL APPARATUS AND METHOD

(76) Inventor: Keplan Hinton, 1503 W. 49th St., Chattanooga, TN (US) 37409

(*) Notice: Subject to any disclaimer, the term of this patent is extended or adjusted under 35 U.S.C. 154(b) by 0 days.

(21) Appl. No.: 10/106,139

(22) Filed: Mar. 25, 2002

Related U.S. Application Data

(60) Provisional application No. 60/278,718, filed on Mar. 26, 2001.

(51) Int. Cl.$^7$ ................................................ B08B 3/00
(52) U.S. Cl. ............................ 134/19; 134/30; 134/38; 134/42; 15/321; 15/322
(58) Field of Search .......................... 134/19, 30, 38, 134/42; 15/321, 322

(56) References Cited

U.S. PATENT DOCUMENTS

| | | | | |
|---|---|---|---|---|
| 3,436,787 A | * | 4/1969 | Wisdom | 15/321 |
| 4,406,707 A | * | 9/1983 | Moore et al. | 134/4 |
| 6,090,238 A | * | 7/2000 | Smith | 156/344 |

* cited by examiner

Primary Examiner—Zeinab El-Arini
(74) Attorney, Agent, or Firm—Stephen J. Stark; Miller & Martin PLLC

(57) ABSTRACT

A method for utilizing a decal removal apparatus provides a low pressure steam to a surface having a decal thereon at a decal area. The applicator has a plate having a seal connected to the bottom portion of the plate defining a cavity therein. An outlet communicates steam from a conduit into the cavity when to cavity is placed against the decal area. The low pressure steam moisturizes the adhesive connecting the decal to the vehicle so that the decal may then be relatively easy removed from the vehicle mechanically or otherwise.

9 Claims, 3 Drawing Sheets

DECAL REMOVAL APPARATUS AND METHOD

This application claims the benefit of U.S. Provisional Patent No. 60/278,718 filed Mar. 26, 2001.

FIELD OF THE INVENTION

A method apparatus as disclosed for use in removing decals from surfaces, and more particularly to a steam applicator for removing decals such as logos and signs from painted metal surface including the side surfaces of vehicles.

BACKGROUND OF THE INVENTION

It is customary for companies to have logos to advertise their service on the side of their vehicles. Tractor trailer often bear the owner's trademarks and company information on their sides. Trucks often indicate the owner's name on the cab doors. Vans and other smaller vehicles often display the company names from logos on the side panel of the vehicles.

Normally the logos, signs and advertisements are decals which are adhered to surfaces of the vehicles. Many times the vehicle surfaces are painted metal, such as painted aluminum or steel tractor trailer bodies. Obviously other vehicles could have other surfaces as well.

When the owner decides to sell the vehicle, it is often desirable to remove the owner's decals from the vehicle in order to maximize the resale value of the vehicle. Traditional methods of a to remove decals include utilizing a propane torch to administer a flame proximate to the decal which softens the adhesive and allows the decal to be pulled from the truck. Unfortunately, the direct application of heat also "cooks" the decal and may potentially burn the vehicle. This could result in a discoloration of the paint on the vehicle which is undesirable. Additionally, when direct heat is applied to a decal, it tends to cook which reduces the resiliency of the decal. Accordingly, it may crack or tear, making removal of the decal difficult.

In addition to propane torches, heat guns have also been utilized to remove decals. Once again, there is the danger of burning the vehicle. Furthermore, in order to remove the label, the heat gun or torch must be set aside while the operator removes the decal since it would not be wise to put one's hands in front of the heat gun or torch in order to pull the decal while applying heat. The operator must be careful where the heat gun is placed so that fires or burns are not inadvertently caused.

Another method of removing decals is the application of a high pressure and narrowly directed stream of water to the decal. Pressurized water in excess of 3000 pounds per square inch (psi) has been utilized for this purpose. Unfortunately, if the paint on the vehicle is not of the highest quality, this high pressure water may remove the paint as well as the decal from the vehicle. This does not maximize the resale value of the vehicle.

SUMMARY OF THE INVENTION

Accordingly, a need exists to remove decals from vehicles which does not damage the vehicle.

Another need exists for an apparatus and method to utilize low pressure steam to moisturize the decal.

Another need exists for low pressure steam to elevate the temperature of the vehicle below a decal.

Another need exists to rubberize a decal to assist in its removal.

Accordingly, a decal removal apparatus includes a water supply, a boiler, a conduit and an applicator for providing low pressure steam to a surface having a decal thereon. The applicator preferably includes a sealed cavity which contains the steam to a specific location relative to the vehicle. The direct application of steam elevates the temperature of the vehicle which is believed to soften the adhesive. Moisturizing the adhesive through the application of steam is believed to further soften the adhesive allowing the decal to be relatively easily removed from the vehicle.

Since low pressure steam is utilized instead of high pressure water or direct dry heat, there is a relatively low risk of damaging the surface of the vehicle as compared to the other prior art techniques. Furthermore, the application of steam to the decal tends to "rubberize" the decal allowing it to be stretched as opposed to "cooking" the decal which results from the direct application of heat which makes the decal brittle and difficult to remove. The "rubberized" decal has been found more easily removable than the "cooked" decal by the applicant. The boiler of the apparatus preferably includes a water level control valve to insure a continuous supply of steam to the applicator without requiring the operator to cease using the applicator to tend to the boiler water level during normal operation.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
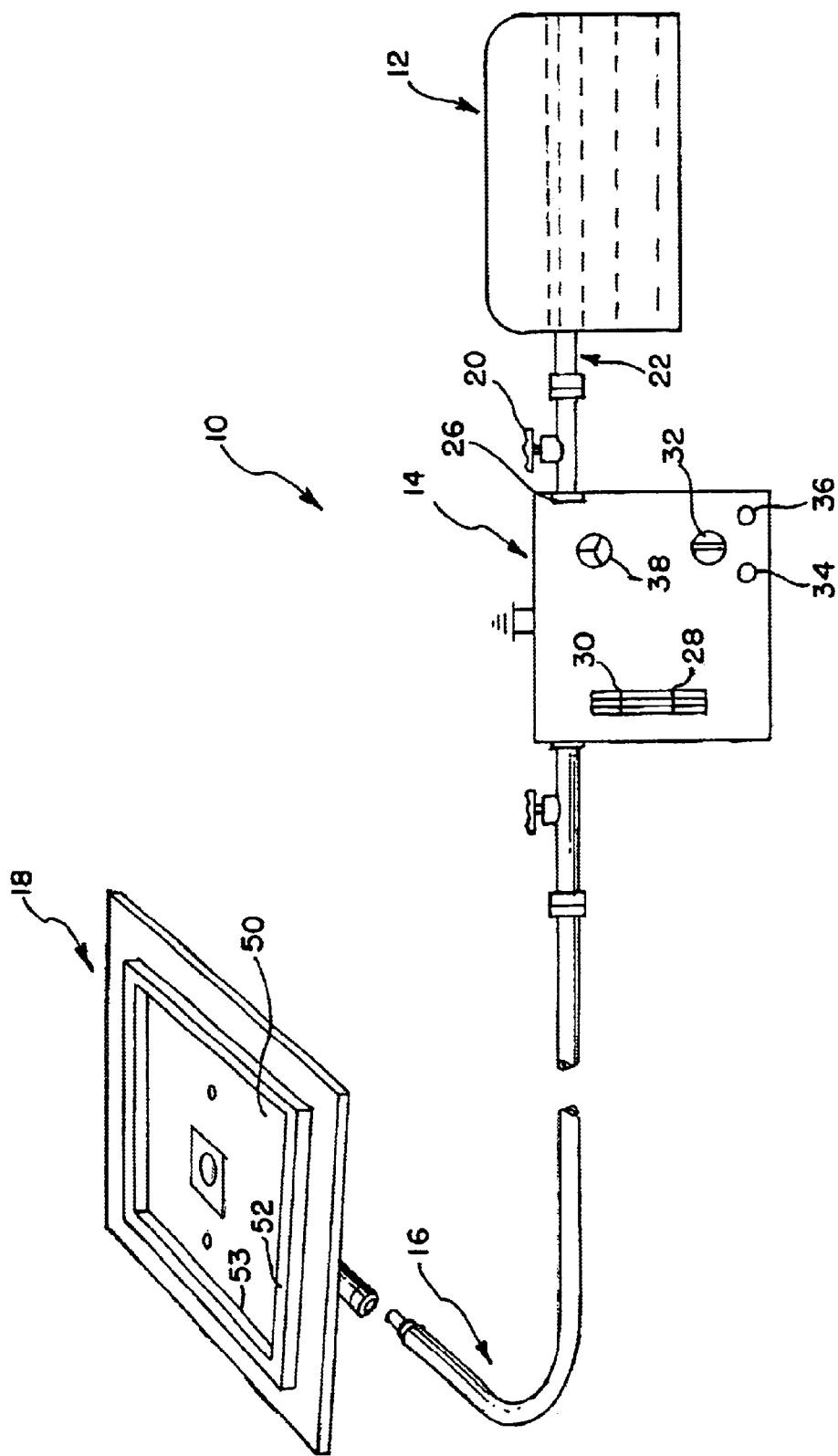
FIG. 1 is a schematic view of the components of the preferred decal removal system.

FIG. 1 shows a decal removing apparatus 10 according to the preferred embodiment of the present invention. The decal removing apparatus 10 includes a water supply 12 connected to a boiler 14. The boiler 14 is connected through a conduit 16 to an applicator 18 in the form of a moisturizing pan.

Water supplied from the water supply 12 is heated in the boiler 14 to create steam. Steam is transferred through the conduit 16 from the boiler 14 to the applicator 18. The applicator 18 communicates the steam with a specific location on a vehicle to moisturize a decal, and preferably, through a decal to assist an operator in removing the decal from the vehicle as described in further detail below.

The water supply 12 maybe any suitable storage container. A one hundred fifty gallon plastic tank has been found to be a satisfactory water supply which does not require refilling during operation of the decal removing apparatus 10 for at least a day, and possible for weeks while being sufficiently portable on a vehicle. At least one shut off valve 20 is preferably utilized to connect the water supply 12 to the boiler 14. A conduit 22, such as a hose, may also be necessary to connect the boiler 14 to the water supply 12.

The boiler 14 utilized in the apparatus 10 is preferably includes electric heating elements which may be powered from a generator or other appropriate electrical source. Since the preferred apparatus is preferably mobile, such as on a van or truck, electric power may be supplied from an appropriately sized portable electric generator such as a 6000 Watt generator. Reimers Electra Steam, Inc., of Clearbrook, Va. 22624 supplied the boiler 14 which has a water capacity of about one gallon and supplies steam at pressures up to forty five psi. For safety, the boiler 14 is preferably equipped with a relief valve 24 set at about 80 psi. Another safety innovation includes a modification to the electric circuitry which requires a water level control valve 26 to be operational before providing electricity to the heater element in the boiler 14. This ensures that the heater in the boiler 14 will not be energized when there is no water in the boiler 14 with a sufficient amount of water to prevent damaging the boiler 14. An amperage of electricity provided to the boiler 14 of about twenty five or thirty amps has been found effective. Two boilers 14 have been utilized in the presently preferred apparatus 10 for redundancy of the system, although only one is illustrated or required.

The water level control valve 26 is contained within the boiler 14. When the water level reaches a low limit 28, the water level control valve 26 opens to allow more water into the boiler 14. When water reaches a second limit 30, the water level control valve 26 shuts to limit the amount of water within the boiler 14. The boiler 14 is equipped with a thermostat 32, an on/off button 34, an indicator light 36 and a pressure gage 38. Other boilers 14 may have different indications and operational controls.

Steam exits the boiler 14 through outlet 40. A shut off valve 42 may be utilized to allow the appropriate steam pressure to build up within the boiler 14. A connection 44 allows for the conduit 16 to be connected to the boiler 14. A quick disconnect connection 44 has been found suitable.

The conduit 14 is preferably ¼ inch conduit rated to at least one hundred psi with an insulating covering with appropriate fittings to cooperate with couplings to direct steam without allowing significant steam leakage, if any. The insulating covering may reduce the risk of burns to operators by inadvertent touching of the conduit 14. A conventional conduit utilized with high pressure water systems as is known in the art can be utilized as a satisfactory conduit 14.

The applicator 18, or pan, is shown in more detail in FIGS. 3-6. The applicator 18 has a handle 46 which may be spaced from a plate 50 by spacers 48. A distance of three inches from the inside portion of the handle 48 to the top surface of the plate 50 has been found adequate to allow an operator no significant discomfort from heat generated by steam in the applicator 18. The handle 46 illustrated is wood which does not tend to conduct heat from the plate 50 through the spacers 48 which are also wood. Other relatively poor heat conductors could also be utilized for the spacers 48 and/or the handle 46.

The plate 50 of the applicator 18 may be constructed from any suitable material. ⅛ inch aluminum plate has been found satisfactory to make a relatively lightweight applicator 18 of sufficient strength. Of course, stainless steel and other materials could also be utilized. The plate 50 illustrated is about 11¾ inches by 9 inches.

Figure 3:
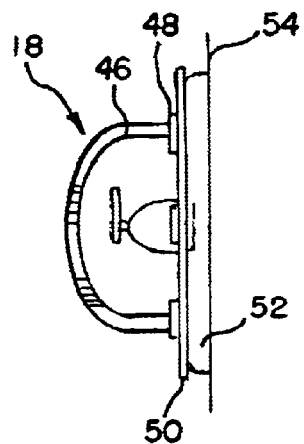
FIG. 3 is a side perspective view of a preferred applicator.
Figure 6:
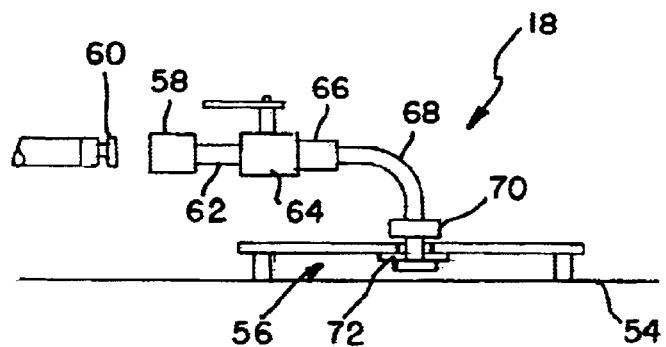
FIG. 6 is a cut-a-way side view of the applicator showing plumbing detail.

A resilient seal 52 is connected to the bottom of the plate 50. The resilient seal 52 of the preferred embodiment was obtained from a door weather stripping for a vehicle (Part No. 08650NA manufactured by the 3M corporation). The seal 52 is about ⅞ inch thick and ¾ wide. Although the seal 52 came in an eight foot length, it was cut to fit as illustrated. The interior dimensions within the seal are about 10 inches by 7½ inches. The seal includes an acrylic foam tape backing which assists in adhering the seal 52 to the plate 50. Additionally, outdoor silicone caulk 53 rated between 220 degrees and 400 degrees Fahrenheit was utilized to secure the seal 52 to the plate 50. The seal 52 forms a cavity 56 between a surface 54 and the plate 50 when placed against the surface 54 as illustrated in FIGS. 3 and 6. The cavity 56 contains the steam supplied from the boiler 14. The seal 52 and plate 50 prevents steam from exiting the applicator 18 when pressed against a surface 54.

Figure 4:
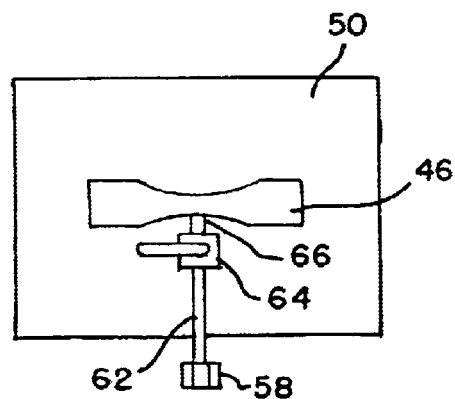
FIG. 4 is a top view of the applicator shown in FIG. 3.
Figure 5:
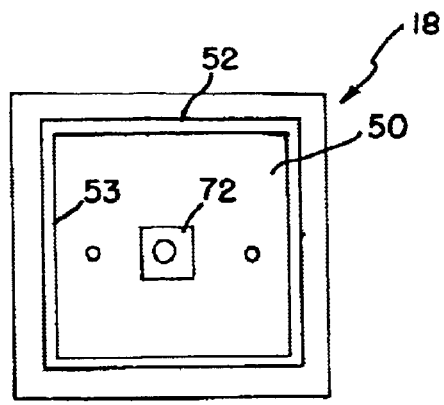
FIG. 5 is a bottom view of the applicator shown in FIGS. 3 and 4.

The applicator 18 contains some plumbing to transfer the steam to the cavity 56. Specifically a quick coupling 58 has been found useful in allowing for rapid assembly of the apparatus 10 by allowing the socket 60 of the conduit 16 to be rapidly connected with the applicator 18. The coupler 58 is connected to a first length of pipe 62 which is connected to a lever operated ball valve 64. A second length of pipe 66 connects the valve 64 to a swivel elbow 68 which makes the applicator 18 easier to use. A socket 60 connects the elbow 68 through the plate 50 to a nut 72. Of course, adapters may be useful to properly switch from one diameter fitting or pipe to another. The length of the first and/or second pipes 62, 66 are preferably selected to position the coupling 58 off of the plate 50 as illustrated in FIG. 4. This plumbing arrangement has been found helpful to prevent an operator from inadvertently touching a hot conduit 16. The valve 64 allows for the applicator 18 to be turned off by the operator without requiring the entire apparatus 10 to be secured.

Figure 2:
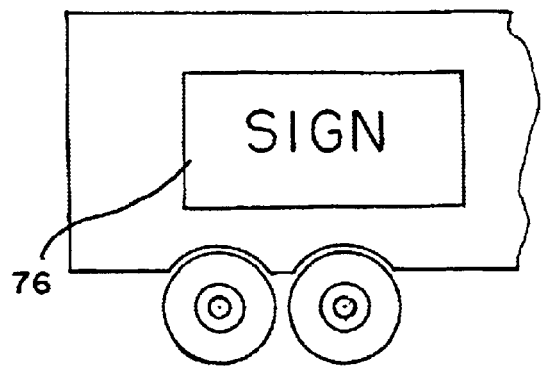
FIG. 2 is a portion of vehicle with a decal.

A typical tractor trailer 74 is illustrated in FIG. 2 with a decal 76 in the form of a sign. Common decals are Stream Decals, Petty Decals and the Regular 3M Decal sold under the name MD5(™). The 3M corporation makes, or has made, at least these three varieties of decals. Most new applications of decals are the Regular 3M Decal. These decals have a finished side which has a sign, label, or other advertisement printed thereon. The opposite side of the decal contains an adhesive which adheres the decal to a vehicle or other surface.

When the owner of a vehicle decides to sell, or remove decals for any other reason, the apparatus 10 of the preferred embodiment may be utilized instead of the traditional methods known in the art. The boiler 14 is started and steam is supplied to the applicator 18. It is preferable that the steam be maintained below about 300 degrees, and more preferably between about two hundred fifty to three hundred degrees. A corresponding pressure may be observed on the pressure gauge 38 of the boiler 14. Steam pressures around forty to fifty psi have been found effective. For safety, a maximum pressure of about fifty five to about sixty psi has been utilized. The relief valve 24 provides a further reassurance of safety in this regard. The thermostat 32 may be adjusted to provide the desired steam temperature for providing to the applicator 18.

Figure 7:
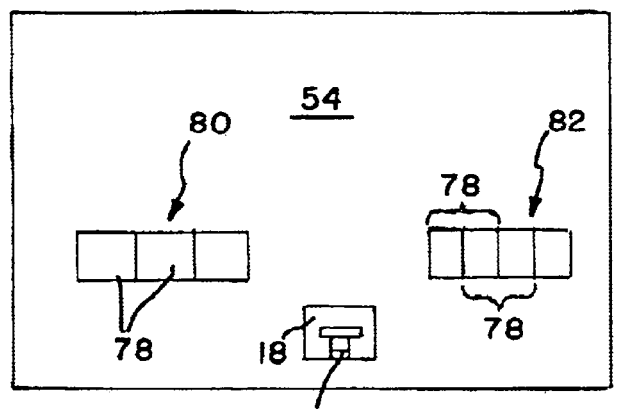
FIG. 7 is a perspective view of the side of a vehicle illustrating two methods of utilizing the decal removal system.

With the valve 64 open, the steam proceeds into the cavity 56 when the applicator is placed against a vehicle surface, as shown in FIGS. 3, 6 and 7. In FIG. 7, the applicator 18 has been utilized in at least two different ways. First, the applicator has a footprint 78 which roughly corresponds with the interior perimeter of the seal 52. The footprints 78 at the left section 80 have been moved so that no overlapping takes place. In fact, the footprints 78 could be spaced a few inches apart for removing some decals. The footprints 78 in the right section 82 overlap. Overlapping footprints about half the distance of the footprint 78 has been found particularly effective at removing even the most stubborn of decals.

The applicator 18 is typically pressed against the vehicle surface 54 and left for a few seconds, such as about three seconds in a first location. The steam is preferably confined within the cavity by the seal 52 and the plate 50. Next the applicator 18 is moved to a second location and the operator with his free hand, since one hand will likely be on handle 46, can then remove the moisturized decal from the first location.

The relatively low pressure steam is believed to penetrate through the finished side of the decal into the adhesive of the decal to allow the decal to be pulled from the vehicle. Additionally, the vehicle surface 54 is elevated in temperature which softens the adhesive without damaging the paint or finish of the vehicle surface 54. Furthermore, the application of low pressure steam to the vehicle has been found to "rubberize" the decal. Instead of "cooking" the decal as is accomplished by application of a direct flame, the steaming of the decal often results in steamed decal which may be stretched. In some applications, a one foot section of steamed decal may be stretched about three feet. In most applications, the adhesive or glue is almost completely removed along with the decal. In some applications a solvent may be necessary to remove remaining adhesive.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of removing a decal from a vehicle surface comprising:

provided a vehicle surface with a decal thereon;

connecting a source of steam to an applicator at a coupling, said applicator having a plate with a top surface, a bottom surface, and a resilient seal extending from the bottom surface of the plate, said seal surrounding a cavity extending from the bottom surface of the plate along the seal, and against one of the surface having the decal thereon and at least a portion of the decal, an outlet located on the bottom of the plate communicating steam from the coupling to the outlet and into the cavity, and a handle connected to the top surface of the plate;

placing the applicator with the seal of the applicator against a decal area on the surface of the vehicle;

applying low pressure steam of less than 60 psi to the decal from the steam source through the outlet, said steam retained within the cavity by the seal thereby treating the decal area by rubberizing said decal;

removing the applicator from the decal area; and removing the treated decal from the decal area of the vehicle surface.

2. The method of claim 1 wherein the steam is applied through the applicator at pressure between about 40 and about 50 psi.

3. The method of claim 1 wherein steam is applied at a temperature less than about 300 degrees Fahrenheit.

4. The method of claim 3 wherein the steam is applied at a temperature between about 250 and about 300 degrees Fahrenheit.

5. The method of claim 1 wherein the applicator further comprises a valve for selectively securing a flow of steam out the outlet of the applicator, and the step of applying steam to the decal further comprises opening the valve.

6. The method of claim 5 further comprising the step of securing the flow of steam out of the outlet of the applicator by shutting the valve.

7. The method of claim 1 wherein the step of removing the decal further comprises manually removing the decal.

8. The method of claim 1 wherein the step of applying steam to the decal moisturizes the decal.

9. The method of claim 1 further comprising the step of compressing the seal against the decal area after applicator against the decal area.

\* \* \* \* \*